(12) United States Patent
Yonetani

(10) Patent No.: US 7,965,450 B2
(45) Date of Patent: Jun. 21, 2011

(54) MICROSCOPE OBJECTIVE

(75) Inventor: Atsushi Yonetani, Ina (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/655,221

(22) Filed: Dec. 23, 2009

(65) Prior Publication Data

US 2010/0165474 A1 Jul. 1, 2010

Related U.S. Application Data

(63) Continuation-in-part of application No. 11/999,644, filed on Dec. 5, 2007, now Pat. No. 7,663,807.

(30) Foreign Application Priority Data

Jan. 31, 2007 (JP) ................................. 2007-021643

(51) Int. Cl.
*G02B 21/02* (2006.01)

(52) U.S. Cl. ........................................ 359/659; 359/656
(58) Field of Classification Search ........... 359/657–661
See application file for complete search history.

(56) References Cited

U.S. PATENT DOCUMENTS

| 5,920,432 | A | 7/1999 | Suenaga et al. |
| 6,501,603 | B2 * | 12/2002 | Kasahara ...................... 359/656 |
| 7,382,542 | B2 | 6/2008 | Wartmann |
| 2010/0091101 | A1 * | 4/2010 | Fujimoto et al. ................ 348/79 |

FOREIGN PATENT DOCUMENTS

| JP | 11-231224 | 8/1999 |
| JP | 2001-021812 | 1/2001 |

* cited by examiner

*Primary Examiner* — William C Choi
(74) *Attorney, Agent, or Firm* — Kenyon & Kenyon LLP

(57) ABSTRACT

A microscope objective includes at least five lens components, which are divided into three groups that are, in order from an object side: a front group having a positive refracting power as a whole and having a meniscus lens component with an object-side surface thereof being concave toward the object side; a middle group having a positive refracting power as a whole and having a plurality of cemented lens components; and a rear group having a pair of concave air-contact surfaces arranged adjacent and opposite to one another, wherein the following conditions are satisfied: $3 \leq D_0/f \leq 6$ and $1 \leq H_2/H_1 \leq 1.5$, where $D_0$ is an axial distance from an object surface to a rearmost surface of the microscope objective, f is a focal length of the microscope objective, $H_2$ is a height of a marginal ray as emergent from the rearmost surface of the microscope objective, and $H_1$ is a maximum height of the marginal ray as passing through the front group and the middle group.

7 Claims, 5 Drawing Sheets

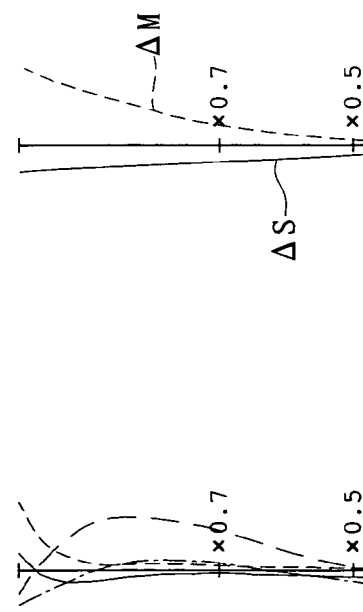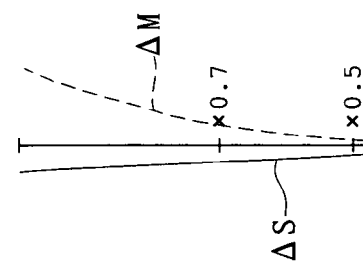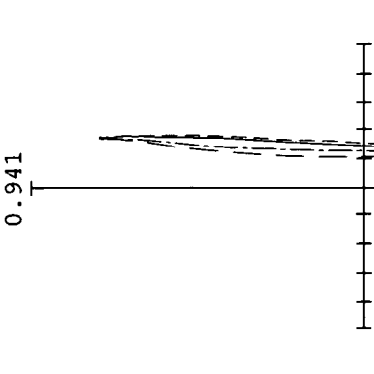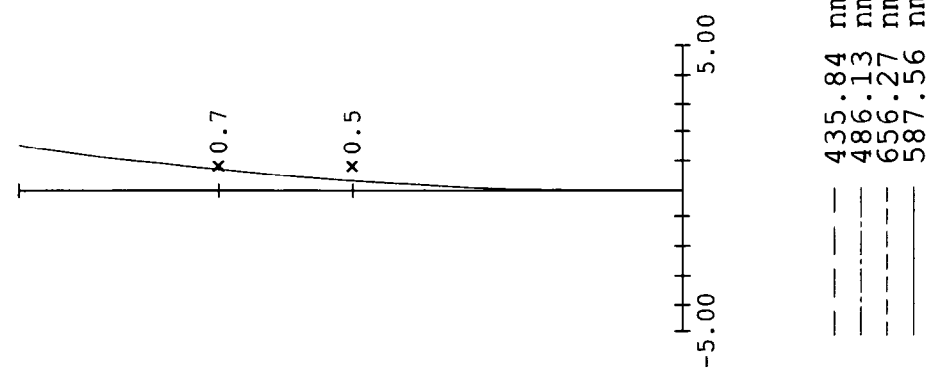

MICROSCOPE OBJECTIVE

This application is a continuation-in-part of application Ser. No. 11/999,644 filed on Dec. 5, 2007 now U.S. Pat. No. 7,663,807, which claims benefits of Japanese Application No. 2007-021643 filed in Japan on Jan. 31, 2007.

BACKGROUND OF THE INVENTION

1. Field of the Invention

This invention relates to a microscope objective applicable to a microscope or microscope system with high extensiveness that provides a large numerical aperture to realize acquisition of a feeble luminous signal at a high S/N ratio in microscopy while having a wide observation range.

To be specific, this invention relates to a microscope objective that provides a wide observation range, a large entrance-side numerical aperture. NA to assure a high resolution, a large exit-side numerical aperture NA' to realize acquisition of a feeble luminous signal at a high S/N ratio, and a good aberration performance.

2. Description of Related Art

In the most advanced research field at present, various methods of observing cells, in vivo, for a long period of time (several days to several weeks) are developed for purposes of the functional clarification of living cells and the behavior analysis and interaction clarification of a protein. As one technique of microscopy for observing a lesion part inside living cells, the method of making a fluorescence observation is largely used. The fluorescence observation is such that, after a particular fluorescent substance like a fluorescent protein is used as a light-emitting label to stain a living specimen like living cells, fluorescent light is produced by irradiation of the specimen with exciting light and is observed to thereby detect the existence and position of a particular part in the living specimen, such as a lesion part inside the living cells.

In the fluorescence observation, when some stimulus is given to the living specimen, for example, by irradiation with exciting light, there is a possibility that the stimulus itself adversely affects an active state of the cell. Consequently, it is desired to provide a microscope system such that the light-emitting label is stimulated with the weakest possible stimulus (low-intensity exciting light) and a weak luminous signal produced in accordance with this stimulus can be detected at extremely high efficiency.

Simultaneously, it is also desired to provide a microscope system in which provisions are made for keeping a state of behavior of the living cell in sight and at the same time, detecting much information from the cell at a time through the observation in a wide range so that a processing speed and work efficiency can be improved.

In general, an objective for biological microscopes is constructed so that an observation object (the specimen) is viewed through a cover glass and is designed so that, for example, aberrations produced by the cover glass are corrected on the premise that the thickness of the cover glass has a constant reference value.

However, the cover glass is attended with a fabrication error. Depending on the observation technique, the observation object is sometimes viewed through a nearly plane-parallel plate such as a cover glass of thickness different from that of the reference value or a Petri dish.

Thus, when the thickness of the cover glass is varied to differ from that of the reference value, aberrations produced in accordance with variation of the thickness of the cover glass cannot be completely compensated for by the objective and imaging performance is degraded. In particular, as the numerical aperture NA becomes high, the degradation of the imaging performance becomes pronounced.

Conventional microscope objectives for compensating for aberrations produced in accordance with the variation of the thickness of the cover glass interposed between the surface of the observation object and the objective are set forth, for example, in Japanese Patent Kokai No. Hei 03-58492 and Japanese Patent No. 3371934.

In the field of conventional microscope apparatuses, however, microscope apparatuses fulfilling the above requirements and microscope systems provided with these microscope apparatuses have no existence. As such, the objectives set forth in the prior art references mentioned above are not constructed on the premise that they are applied to microscope apparatuses fulfilling the above requirements and microscope systems provided with these microscope apparatuses.

In this regard, the applicant of the present invention, in Japanese Patent Kokai No. 2007-41510 filed by this applicant, has proposed a microscope fulfilling the above requirements, that is, a microscope with high extensiveness that provides a large numerical aperture to realize acquisition of a feeble luminous signal at a high S/N ratio while having a wide observation range, and a microscope system provided with such a microscope.

Even in such a microscope objective, it is desired to correct aberrations produced in accordance with variation of the thickness of the cover glass. In biochemical microscopy, the fluctuation of aberrations may be caused not only by variation of the thickness of the cover glass, but also by a difference with room temperature in the case where the microscope is used at the temperature of cell culture, and correction of the fluctuation of aberrations is desired.

To be more specific, what is required for the above-mentioned microscope system optimized for fluorescence observation of living specimen is a microscope objective having a wide observation range, a large entrance-side numerical aperture NA, a large exit-side numerical aperture NA', and a good aberration performance.

Conventional microscope objectives having a wide observation range, a large exit-side numerical aperture NA' and a good aberration performance are set forth, for example, in:

Japanese Patent Kokai No. 2001-21812, which discloses an objective of dry type with magnification $\beta=2\times$, focal length f=90 mm, total length $D_t$=69 mm, entrance-side numerical aperture NA=0.13 and exit-side numerical aperture NA'=0.65;

Japanese Patent Kokai No. Hei 11-231224, which discloses an objective of dry type with magnification $\beta=4\times$, focal length f=45 mm, total length $D_t$=66.8 mm, entrance-side numerical aperture NA=0.267 and exit-side numerical aperture NA'=0.06675;

U.S. Pat. No. 5,920,432, which discloses an objective of dry type with magnification $\beta=10\times$, focal length f=20 mm, total length $D_t$=63.2 mm, entrance-side numerical aperture NA=0.5 and exit-side numerical aperture NA'=0.05, and an objective of dry type with magnification $\beta=20\times$, focal length f=10 mm, total length $D_t$=61.7 mm, entrance-side numerical aperture NA=0.75 and exit-side numerical aperture NA'=0.038;

Japanese Patent Kokai No. 2005-189732, which discloses an objective of water immersion type with magnification $\beta=1.6\times$, focal length f=12.5 mm, total length $D_t$=79.4~91.6 mm, entrance-side numerical aperture NA=0.8 and exit-side numerical aperture NA'=0.05;

U.S. Pat. No. 6,501,603 B2, which discloses an objective of dry type with magnification $\beta=20\times$, focal length f=9 mm, total length $D_t$=72.9 mm, entrance-side numerical aperture NA=0.8 and exit-side numerical aperture NA'=0.04; and an objective of water immersion type with magnification β=20×, focal length f=9 mm, total length $D_t$=79.5~80.3 mm, entrance-side numerical aperture NA=0.9~0.94 and exit-side numerical aperture NA'=0.045~0.047;

Japanese Patent Kokai No. 2007-133071, which discloses an objective of oil immersion type with magnification β=20×, focal length f=10 mm, total length $D_t$=60.2~62.4 mm, entrance-side numerical aperture NA=0.95 and exit-side numerical aperture NA'=0.0475; and U.S. Pat. No. 7,382,542 B2, which discloses an objective of water immersion type with magnification β=20×, focal length f=8.2 mm, total length $D_t$=71.4~78.5 mm, entrance-side numerical aperture NA=1.0 and exit-side numerical aperture NA'=0.05.

SUMMARY OF THE INVENTION

A microscope objective according to the first aspect of the present invention includes, in order from the object side, a first lens unit with positive refracting power, having two meniscus lenses, each with a concave surface facing the object side, and at least one positive lens; a second lens unit with positive refracting power; and a third lens unit having lenses in which concave surfaces adjacent and opposite to each other are configured as air contact surfaces.

In the microscope objective according to the first aspect of the present invention, it is desirable to satisfy the following conditions:

$$7 \leq f \quad (1)$$

$$0.5 < NA \quad (2)$$

where f is a focal length (mm) of the microscope objective and NA is an entrance-side numerical aperture of the microscope objective.

In the microscope objective according to the first aspect of the present invention, it is desirable that the second lens unit is movable along the optical axis so that the fluctuation of aberrations produced in accordance with variation of the thickness of a nearly plane-parallel plate interposed between an observation object and the first lens unit can be corrected.

In the microscope objective according to the first aspect of the present invention, it is desirable that the second lens unit satisfies the following condition:

$$0.8 \leq |\beta_2| \leq 1.2 \quad (3)$$

where $\beta_2$ is a lateral magnification of the second lens unit calculated upon an image point formed by the first lens unit being defined as an object point.

In the microscope objective according to the first aspect of the present invention, it is desirable that a positive lens located on the image side of the two meniscus lenses of the first lens unit is movable along the optical axis so that the fluctuation of aberrations produced in accordance with variations of ambient temperatures of the microscope objective and on the periphery of the microscope objective can be corrected.

In the microscope objective according to the first aspect of the present invention, it is desirable to satisfy the following condition:

$$60 < D \leq 120 \quad (4)$$

where D is an axial distance (mm) (a distance measured along on the optical axis) from an object surface to a nosepiece mounting surface of the microscope objective where a direction from the object side toward the image side is defined to be positive. Here, the object surface refers to a surface perpendicular to the optical axis of the microscope objective, including the observation object, and the nosepiece mounting surface of the microscope objective refers to an abutting surface where the microscope objective is mounted to a microscope body.

A microscope objective according to the second aspect of the present invention includes at least five lens components, which are divided into three groups that are, in order from an object side: a front group having a positive refracting power as a whole and including a meniscus lens component with an object-side surface thereof being concave toward the object side; a middle group having a positive refracting power as a whole and including a plurality of cemented lens components; and a rear group including a pair of concave air-contact surfaces arranged adjacent and opposite to one another, wherein the following conditions are satisfied:

$$3 \leq D_0/f \leq 6 \quad (5)$$

$$1 \leq H_2/H_1 \leq 1.5 \quad (6)$$

where $D_0$ is an axial distance (mm) (a distance measured along on an optical axis) from an object surface to a rearmost surface of the microscope objective where a direction from the object side toward an image side is defined to be positive and the object surface is defined as a surface in which an observation object lies and which is perpendicular to the optical axis, f is a focal length (mm) of the microscope objective, $H_2$ is a height (mm) of a marginal ray as emergent from the rearmost surface of the microscope objective, and $H_1$ is a maximum height (mm) of the marginal ray as passing through the front group and the middle group. It is much preferable that the following condition is satisfied:

$$1.1 \leq H_2/H_1 \leq 1.4 \quad (6\text{-}1)$$

In the microscope objective according to the second aspect of the present invention, it is desirable to satisfy the following condition:

$$-20 \leq f_R/f \leq -6 \quad (7)$$

where $f_r$ is a focal length (mm) of the rear group. It is much preferable that the following condition is satisfied:

$$-18 \leq f_R/f \leq -8 \quad (7\text{-}1)$$

In the microscope objective according to the second aspect of present invention, it is desirable to satisfy the following condition:

$$0.3 \leq |R_1/f| \leq 0.5 \quad (8)$$

where $R_1$ is a radius of curvature of the object-side surface of the meniscus lens component in the front group.

In the microscope objective according to the second aspect of the present invention, it is desirable to satisfy the following conditions:

$$7 \leq f \quad (1)$$

$$0.5 < NA \quad (2)$$

$$0.05 < NA' \quad (9)$$

where NA is a entrance-side numerical aperture of the microscope objective, and NA' is an exit-side numerical aperture of the combination of the microscope objective and an imaging lens.

In the microscope objective according to the second aspect of the present invention, it is desirable that the middle group has a positive lens component that is configured to be movable along the optical axis for correcting fluctuation of aberrations produced in accordance with variation of a thickness of a cover glass. In this case, it is much desirable to satisfy the following condition:

$$0.8 \leq |\beta_m| \leq 1.2 \quad (3')$$

where $\beta_m$ is a lateral magnification of the positive lens component in the middle group calculated upon an image point formed by lenses arranged on the object side of the positive lens component being defined as an object point.

In the microscope objective according to the second aspect of the present invention, it is desirable that the front group includes a positive lens component that is movable along the optical axis for correcting fluctuation of aberrations produced in accordance with variations of temperature of the microscope objective and ambient temperature around the microscope objective.

Alternatively, the microscope objective according to the second aspect of the present invention satisfies Conditions (1), (2) and (9) instead of Condition (6).

According to the present invention, it is possible to obtain a microscope objective that is applicable to a microscope or microscope system with high extensiveness and a large numerical aperture to realize acquisition of a feeble luminous signal at a high S/N ratio, upon having a wide field and a large numerical aperture while maintaining compatibility with conventional microscope systems and exhibiting performance of favorable compensation for aberrations.

Also, according to the present invention, it is possible to obtain a microscope objective that provides a wide observation range, a large entrance-side numerical aperture NA to assure a high resolution, a large exit-side numerical aperture NA' to realize acquisition of a feeble luminous signal at a high S/N ratio, and a good aberration performance.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, 2C, and 2D are graphs showing spherical aberration, astigmatism, chromatic aberration of magnification, and distortion, respectively, of the microscope objective in Embodiment 1.

DETAILED DESCRIPTION OF THE PREFERRED EMBODIMENTS

Figure 1:
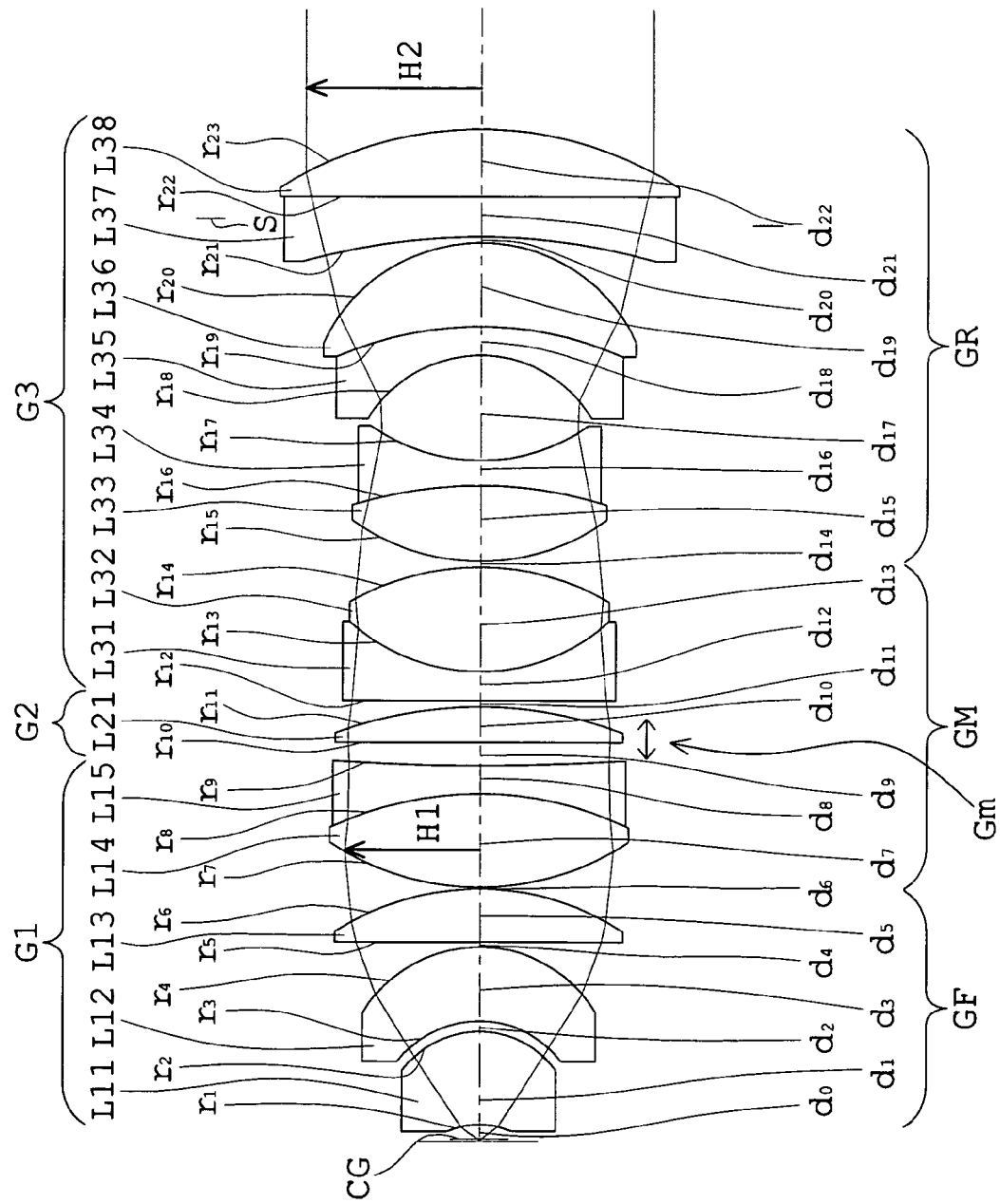
FIG. 1 is a sectional view showing a schematic arrangement, developed along the optical axis, of Embodiment 1 of the microscope objective according to the present invention.

Before undertaking the description of the embodiments, the function and effect of the present invention will be explained in detail.

A microscope objective according to the first aspect of the present invention includes, in order from the object side, a first lens unit with positive refracting power, having two meniscus lenses, each with a concave surface facing the object side, and at least one positive lens; a second lens unit with positive refracting power; and a third lens unit having lenses in which concave surfaces adjacent and opposite to each other are configured as air contact surfaces.

This lens arrangement provides the objective suitable for the microscope apparatus and the microscope system of Patent Publication No. 2007-41510 mentioned above.

When the first lens unit is constructed so that the two meniscus lenses, each with a concave surface facing the object side, are arranged in turn, ray height can be progressively increased without oversupplying the refracting power.

When the second lens unit is constructed to have the positive refracting power, it is avoidable to make the ray height greater than is necessary, and thus the amount of production of aberrations can be kept to a minimum.

When the third lens unit is constructed to have the lenses in which concave surfaces adjacent and opposite to each other are configured as air contact surfaces, the Petzval sum can be easily reduced.

Also, it is desirable that the air contact surfaces of the concave surfaces adjacent and opposite to each other are constructed by only one set, from the viewpoint of a reduction in the number of lenses and the simplification of the internal structure of the objective, as compared with the construction by a plurality of sets.

In the microscope objective according to the first aspect of the present invention, it is desirable to satisfy Conditions (1) and (2). When Conditions (1) and (2) are satisfied, it is possible to obtain the objective which is suitable for the microscope apparatus and the microscope system of Patent Publication No. 2007-41510 and which has a wide field, a low magnification, and a high NA while maintaining the compatibility with the conventional microscope system.

In the microscope objective according to the first aspect of the present invention, it is desirable that the second lens unit is movable along the optical axis so that the fluctuation of aberrations produced in accordance with variation of the thickness of a nearly plane-parallel plate interposed between an observation object and the first lens unit can be corrected.

This construction brings about the objective with a correction collar which has a wide field and a high NA, capable of correcting the fluctuation of aberrations produced in accordance with variation of the thickness of the cover glass.

In the microscope objective according to the first aspect of the present invention, it is desirable that the second lens unit satisfies Condition (3). When Condition (3) is satisfied, it is possible to obtain the objective with a correction collar, having a wide field and a high NA, in which even when the thickness of the cover glass is varied, the shift of the position of an image point can be kept to a minimum, and in which convenience of the work of correction for aberrations is improved.

In the second lens unit for correcting aberrations, in order to keep the positional shift of the image point to a minimum, it is necessary to minimize the refracting power of the second lens unit. For example, when the second lens unit is constructed of plane-parallel plate glass, the shift is not caused to the image point even when the second lens unit is moved. This is based on conditions that the refracting power of the plane-parallel plate glass is zero and the magnification is 1 with respect to an object at an infinite object distance. These conditions also mean that an image magnification is always 1 with respect to an object at an arbitrary object distance. When the second lens unit for correcting aberrations with respect to a paraxial ray is equivalent to the plane-parallel plate glass, the image point requires a smaller shift. Thus, in order to keep the shift of the image point to a minimum, it is necessary that the second lens unit has the lowest possible refracting power and at the same time, the magnification is nearly 1.

When the second lens unit fails to satisfy Condition (3), the shift of the image point is increased and the work of correction for aberrations becomes difficult.

In the microscope objective according to the first aspect of the present invention, it is desirable that a positive lens located on the image side of the two meniscus lenses of the first lens unit is movable along the optical axis so that the fluctuation of aberrations produced in accordance with variations of ambient temperatures of the microscope objective and on the periphery of the microscope objective can be corrected.

This construction brings about the microscope objective with a temperature correction collar which has a wide field and a high NA, capable of correcting the fluctuation of aberrations which may be produced by a difference with room temperature in the case where the microscope is used at the temperature of cell culture, in addition to the variation of the thickness of the cover glass.

In the microscope objective according to the first aspect of the present invention, it is desirable to satisfy Condition (4). If the distance D is below the lower limit of Condition (4), space for using a sufficient number of lenses required to make correction for aberrations described above will cease to be ensured. On the other hand, beyond the upper limit of Condition (4), the entire objective is bulky and the compact design of the entire microscope system becomes difficult.

A microscope objective according to the second aspect of the present invention includes at least five lens components, which are divided into three groups that are, in order from an object side, a front group having a positive refracting power as a whole and including a meniscus lens component with an object-side surface thereof being concave toward the object side, a middle group having a positive refracting power as a whole and including a plurality of cemented lens components, and a rear group including a pair of concave air-contact surfaces arranged adjacent and opposite to one another, and satisfy Conditions (5) and (6).

The front group makes the beam of rays from the object converge by the positive power. Having a meniscus lens component with an object-side surface thereof being concave toward the object side is advantageous in compensation for curvature of field.

The middle group makes the beam of rays further converge moderately by the positive power. Each aberration is sufficiently compensated for by the cemented lens components.

The rear group makes the beam of rays diverge and broaden by the negative power. Further, it collimates the beam of rays. Each aberration is sufficiently compensated for by the negative power of the concave surfaces.

Conditions (5) and (6) are provided to stay the magnification low for assuring a wide field and to obtain a large entrance-side numerical aperture NA. A low magnification and a large entrance-side numerical aperture NA yield a large exit-side numerical aperture NA'.

If the lower limit of Condition (5) is not reached, the entire length of the objective becomes short, and thus it is difficult to arrange in the space a lens having an optimum power for achieving a low magnification and a large numerical aperture.

If the upper limit of Condition (5) is exceeded, the entire length of the objective becomes long, requiring a useless lens, which is not economical.

If the lower limit of Condition (6) is not reached, the height of marginal rays at the front group and the middle group becomes high. A high ray height makes it difficult for the middle group to compensate for aberrations. In addition, if the rays enter the rear group as maintaining the high ray height, the negative power of the concave surfaces in the rear group can not effectively work. As a result, it becomes difficult to obtain a large entrance-side numerical aperture NA.

If the upper limit of Condition (6) is exceeded, the height of marginal rays at the front group and the middle group becomes low. That is, the positive power of the front group is so strong as to make it difficult to compensate for aberrations generated in the front group.

It is much preferable that Condition (6-1) is satisfied.

In the microscope objective according to the second aspect of the present invention, it is desirable to satisfy Condition (7).

Condition (7) regulates the power distribution of the rear group. The power of the rear group is an important factor for the low-magnification design.

If the lower limit of Condition (7) is not reached, the power of the rear group becomes weak, to render the ray height at the exit side low. Accordingly, it causes difficulty in securing a large exit-side numerical aperture NA'.

If the upper limit of Condition (7) is exceeded, the power of the rear group becomes strong. This arrangement is advantageous for the low-magnification design, while the ray height at the front group and the middle group are difficult to set high. Accordingly, it is difficult to secure a large entrance-side numerical aperture NA.

It is much preferable that Condition (7-1) is satisfied.

In the microscope objective according to the second aspect of present invention, it is desirable to satisfy Condition (8).

Condition (8) specifies a condition for sufficiently compensating for curvature of field and assuring a practical working distance WD. In order to assure a wide observation range, it is necessary to sufficiently compensate for the curvature of field.

If the lower limit of Condition (8) is not reached, it is difficult to obtain a practical working distance WD.

If the upper limit of Condition (8) is exceeded, it is difficult to sufficiently compensate for the curvature of field.

In the microscope objective according to the second aspect of the present invention, it is desirable to satisfy Conditions (1), (2) and (9).

Condition (1) provides a condition for obtaining a wide field. Condition (2) is a necessary condition for achieving a high resolution. Condition (9) is a necessary condition for acquiring a feeble luminous signal at high S/N ratio.

In the microscope objective according to the second aspect of the present invention, it is desirable that the middle group includes a positive lens component that is configured to be movable along the optical axis for correcting fluctuation of aberrations produced in accordance with variation of a thickness of a cover glass. In the state where the entrance-side numerical aperture NA is large, aberrations are greatly fluctuated in accordance with variation of a thickness of a cover glass. Therefore, to assure well-conditioned image forming, it is desirable to provide a so-called correction collar.

In this case, it is desirable that the movable positive lens component in the middle group satisfies Condition (3').

When Condition (3') is satisfied, it is possible to obtain an objective with a correction collar, having a wide field and a high entrance-side numerical aperture NA, in which even when the thickness of the cover glass is varied, positional shift of an image point can be kept to a minimum, and in which convenience of the work of correction for aberrations is improved.

In the positive movable lens component of the middle group for correcting aberrations, in order to keep the positional shift of the image point to a minimum, it is necessary to minimize the refracting power of the positive movable lens component. For example, if the movable lens component were constructed of a plane-parallel plate glass, movement of the movable lens component would not shift the image point. This is based on conditions that the refracting power of the plane-parallel plate glass is zero and the magnification is 1 with respect to an object at an infinite object distance. These conditions also mean that an image magnification is always 1 with respect to an object at any object distance. When the movable lens component in the middle group for correcting aberrations with respect to paraxial rays is substantially equivalent to a plane-parallel plate glass, the amount of shift of the image point caused by movement of the movable lens component is allowed to be small. Thus, in order to keep the shift of the image point to a minimum, it is necessary that the movable lens component in the middle group has a lowest possible refracting power and at the same time, the magnification is nearly 1.

When the movable lens component in the middle group fails to satisfy Condition (3'), the shift of the image point is increased and the work of correction for aberrations becomes difficult.

In the microscope objective according to the second aspect of the present invention, it is desirable that the front group includes a positive lens component that is movable along the optical axis for correcting fluctuation of aberrations produced in accordance with variations of temperature of the objective and ambient temperature around the objective.

In the state where the entrance-side numerical aperture NA is large and the entire length of the objective is long, aberrations are greatly fluctuated in accordance with variations of temperature of the microscope objective and ambient temperature around the objective.

Alternatively, a microscope objective according to the second aspect of the present invention includes at least five lens components, which are divided into three groups that are, in order from an object side, a front group having a positive refracting power as a whole and including a meniscus lens component with an object-side surface thereof being concave toward the object side, a middle group having a positive refracting power as a whole and including a plurality of cemented lens components, and a rear group including a pair of concave air-contact surfaces arranged adjacent and opposite to one another, and satisfy Conditions (5), (1), (2) and (9).

As explained above, the numerical conditions are set to obtain a small magnification for obtaining a wide field, to achieve a high resolution, to acquire a feeble luminous signal at high S/N ratio, and to obtain an optimum entire length of the objective for good aberration performance.

Embodiment 1

In accordance with the drawings, the embodiments of the present invention will be explained below.

FIG. 1 shows a schematic arrangement, developed along the optical axis, of Embodiment 1 of the microscope objective according to the present invention. FIGS. 2A, 2B, 2C, and 2D are graphs showing spherical aberration, astigmatism, chromatic aberration of magnification, and distortion, respectively, of the microscope objective in Embodiment 1, in a case where the distance between the objective and an imaging lens (tube lens unit) is 80 mm.

The microscope objective of Embodiment 1 includes, in order from the object side, a first lens unit G1, a second lens unit G2, and a third lens unit G3. Also, in FIG. 1, reference symbol CG represents a cover glass.

The first lens unit G1 includes, in order from the object side, a positive meniscus lens L11 with a concave surface facing the object side, a negative meniscus lens L12 with a concave surface facing the object side, a plano-convex lens L13 whose object-side surface is flat and whose image-side surface is convex, and a cemented doublet of a biconvex lens L19 and a biconcave lens L15, and has positive refracting power as a whole.

The second lens unit G2 (Gm) is constructed with a plano-convex lens L21 whose object-side surface is flat and whose image-side surface is convex.

Also, the second lens unit G2 (Gm) is constructed to be movable along the optical axis so that the fluctuation of aberrations produced in accordance with a change of the thickness of a nearly plane-parallel plate, such as a cover glass or a Petri dish, interposed between an observation object and the first lens unit G1 can be corrected.

The third lens unit G3 includes, in order from the object side, a cemented doublet of a plano-concave lens L31 whose object-side surface is flat and whose image-side surface is concave and a biconvex lens L32, a cemented doublet of a biconvex lens L33 and a biconcave lens L34, a cemented doublet of a negative meniscus lens L35 with a concave surface facing the object side and a positive meniscus lens L36 with a concave surface facing the object side, and a cemented doublet of a plano-concave lens L37 whose object-side surface is concave and whose image-side surface is flat and a plano-convex lens L38 whose object-side surface is flat and whose image-side surface is convex.

The biconcave lens L34 and the negative meniscus lens L35 are such that a set of concave surfaces adjacent and opposite to each other are configured as air contact surfaces.

In view of the second aspect of the present invention, the lenses constituting the microscope objective of Embodiment 1 are divided into three groups that are, in order from the object side, a front group GF, a middle group GM, and a rear group GR. The lenses L11 to L13 form the front group GF, which has a positive refractive power as a whole. The lenses L14 to L32 form the middle group GM, which has a positive refractive power as a whole. The lenses L33 to L38 form the rear group GR, which has a negative refractive power as a whole.

Subsequently, numerical data of optical members constituting the microscope objective of Embodiment 1 are shown below. In the numerical data, $r_1, r_2, \ldots$ denote radii of curvature of surfaces of the optical members; $d_1, d_2, \ldots$ denote axial distances (distances measured along on the optical axis) between adjacent surfaces, of the optical members (thicknesses or air spacings between them); $n_{d1}, n_{d2}, \ldots$ denote refractive indices of the optical members at the d line; $\nu_{d1}, \nu_{d2}, \ldots$ denote Abbe's numbers of the optical members at the d line; $\beta_0$ denotes a magnification of an entire system constructed of the objective and an imaging lens (tube lens unit) having a focal length of 180 mm combined together with a distance of 80 mm between; f denotes a focal length of the objective; NA denotes an entrance-side numerical aperture of the objective; NA' denotes an exit-side numerical aperture; $f_R$ denotes a focal length of the rear group; $D_0$ denotes an axial distance (a distance measured along on the optical axis) from the object surface to the rearmost surface of the objective; $H_1$ denotes a maximum height of a marginal ray as passing through the front group and the middle group; $H_2$ denotes a height of the marginal ray as emergent from the rearmost surface of the objective; $R_1$ denotes a radius of curvature of the object-side surface of the meniscus lens component in the first group; $\beta_2(\beta m)$ denotes the lateral magnification of the second lens unit G2 (movable lens Gm in the middle group) calculated upon an image point formed by the first lens unit G1 (the lenses arranged on the object side of the movable lens Gm) being defined as an object point; $d_0$ denotes an axial distance (a distance measured along on the optical axis) from the upper surface of the cover glass to the first surface of the objective; and D denotes an axial distance (a distance measured along on the optical axis) from the object surface to a nosepiece mounting surface S of the objective.

In the numerical data, the unit of length (distance) is millimeter. Regarding each axial distance from one point to another, a direction from the object side toward the image side is defined to be positive.

These symbols are also used for the numerical data of another embodiment to be described later.

Numerical data 1 (Embodiment 1)

cover glass thickness: 0.17 mm
$\beta_0 = 10x$
f = 18 mm
NA = 0.8
NA' = 0.08
$f_R = -205$ mm
$D_0 = 84.1687$ mm
(where cover glass
thickness is 0.17 mm)
$H_1 = 11.23$ mm
$H_2 = 14.36$ mm
$R_1(r_1) = -7.3878$
$D_0/f = 4.68$
$H_2/H_1 = 1.28$
$f_R/f = -11.4$
$|R_1/f| = 0.41$
$\beta_2(\beta_m) = -1.11$

| | | | |
|---|---|---|---|
| $r_1 = -7.3878$ | $d_1 = 7.7502$ | $n_{d1} = 1.7865$ | $\nu_{d1} = 50$ |
| $r_2 = -8.0452$ | $d_2 = 0.7875$ | | |
| $r_3 = -8.8338$ | $d_3 = 6.1369$ | $n_{d3} = 1.603$ | $\nu_{d3} = 65.44$ |
| $r_4 = -11.3001$ | $d_4 = 0.4246$ | | |
| $r_5 = \infty$ | $d_5 = 4.4184$ | $n_{d5} = 1.497$ | $\nu_{d5} = 81.54$ |
| $r_6 = -21.451$ | $d_6 = 0.1139$ | | |
| $r_7 = 21.7103$ | $d_7 = 7.8237$ | $n_{d7} = 1.43875$ | $\nu_{d7} = 94.93$ |
| $r_8 = -28.7977$ | $d_8 = 2.4$ | $n_{d8} = 1.7725$ | $\nu_{d8} = 49.6$ |
| $r_9 = 192.794$ | $d_9 = 1.9779$ | | |
| $r_{10} = \infty$ | $d_{10} = 2.9889$ | $n_{d10} = 1.43875$ | $\nu_{d10} = 94.93$ |
| $r_{11} = -32.0412$ | $d_{11} = 0.4775$ | | |
| $r_{12} = \infty$ | $d_{12} = 2.3$ | $n_{d12} = 1.7725$ | $\nu_{d12} = 49.6$ |
| $r_{13} = 15.6187$ | $d_{13} = 8.8294$ | $n_{d13} = 1.43875$ | $\nu_{d13} = 94.93$ |
| $r_{14} = -21.5268$ | $d_{14} = 0.4918$ | | |
| $r_{15} = 17.755$ | $d_{15} = 6.337$ | $n_{d15} = 1.43875$ | $\nu_{d15} = 94.93$ |
| $r_{16} = -35.4936$ | $d_{16} = 2.1$ | $n_{d16} = 1.6134$ | $\nu_{d16} = 44.27$ |
| $r_{17} = 15.8401$ | $d_{17} = 8.7105$ | | |
| $r_{18} = -10.6688$ | $d_{18} = 2.4$ | $n_{d18} = 1.788$ | $\nu_{d18} = 47.37$ |
| $r_{19} = -28.6362$ | $d_{19} = 6.8611$ | $n_{d19} = 1.43875$ | $\nu_{d19} = 94.93$ |
| $r_{20} = -14.2704$ | $d_{20} = 0.5298$ | | |
| $r_{21} = -52.7292$ | $d_{21} = 3.3$ | $n_{d21} = 1.51633$ | $\nu_{d21} = 64.14$ |
| $r_{22} = \infty$ | $d_{22} = 5.5916$ | $n_{d22} = 1.673$ | $\nu_{d22} = 38.15$ |
| $r_{23} = -30.4292$ | | | |

-continued

Numerical data 1 (Embodiment 1)

axial distance from surface $r_{23}$ to nosepiece mounting surface S: –10 mm

| cover glass thickness | $d_0$ | $d_9$ | $d_{11}$ | D | $D_0$ |
|---|---|---|---|---|---|
| 0.1204 mm | 1.2804 | 2.1412 | 0.3143 | 74.1516 | 84.1516 |
| 0.17 mm | 1.248 | 1.9779 | 0.4775 | 74.1687 | 84.1687 |
| 0.249 mm | 1.1965 | 1.7039 | 0.7516 | 74.1963 | 84.1963 |

Embodiment 2

Figure 3:
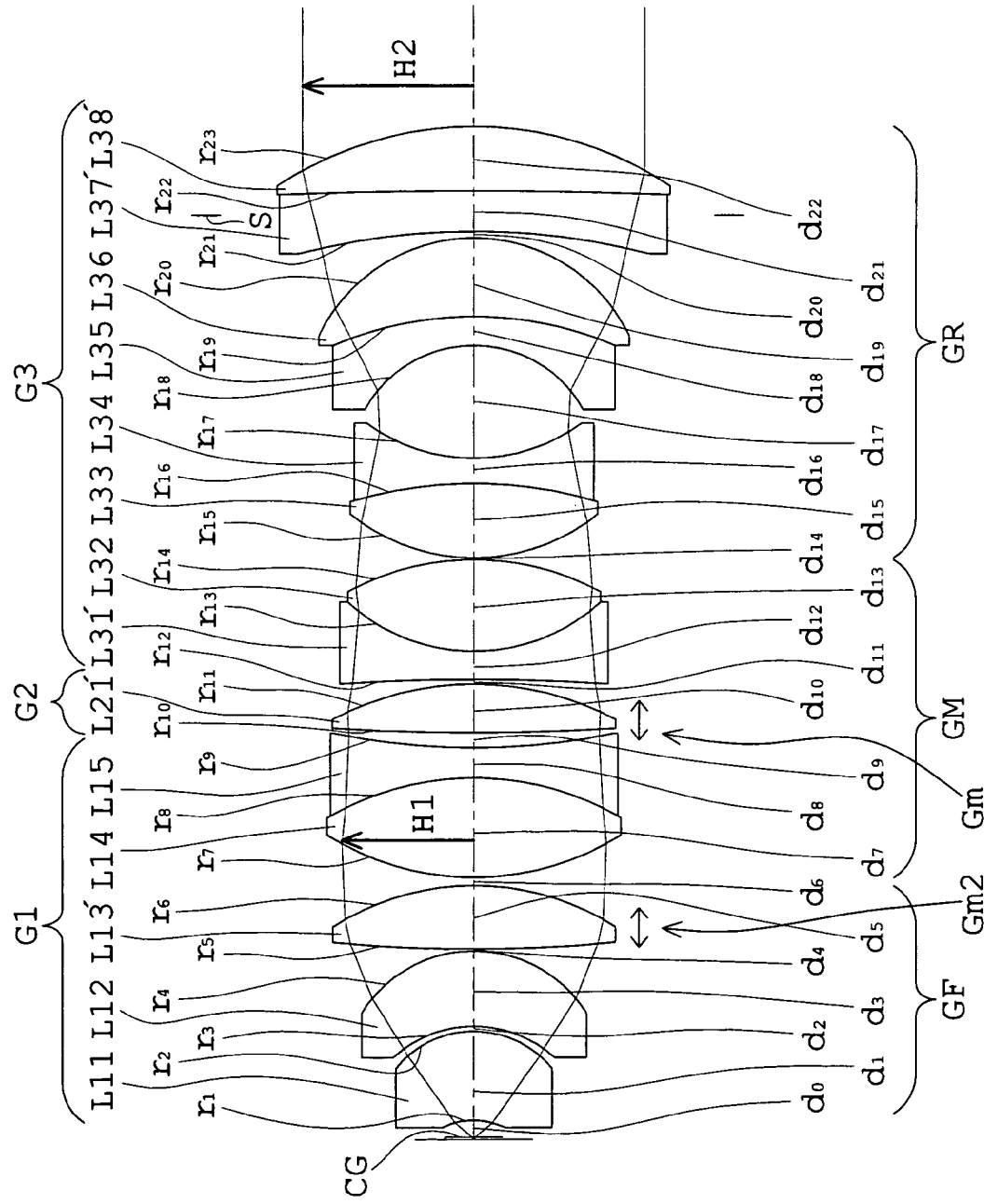
FIG. 3 is a sectional view showing a schematic arrangement, developed along the optical axis, of Embodiment 2 of the microscope objective according to the present invention.
Figure 4:
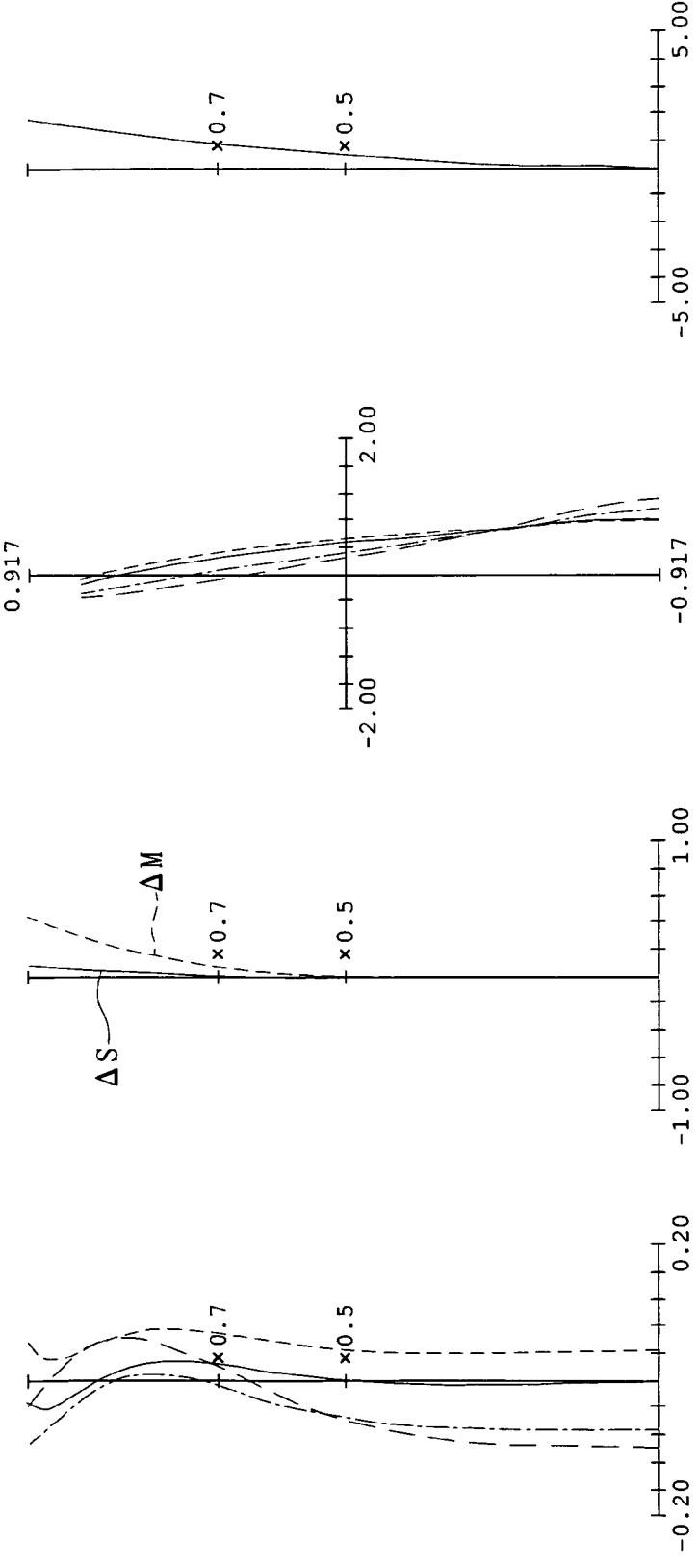
FIGS. 4A, 4B, 4C, and 4D are graphs showing spherical aberration, astigmatism, chromatic aberration of magnification, and distortion, respectively, of the microscope objective in Embodiment 2.

FIG. 3 shows a schematic arrangement of Embodiment 2 of the microscope objective according to the present invention. FIGS. 4A, 4B, 4C, and 4D are graphs showing spherical aberration, astigmatism, chromatic aberration of magnification, and distortion, respectively, of the microscope objective in Embodiment 2, in a case where the distance between the objective and an imaging lens (tube lens unit) is 80 mm.

The microscope objective of Embodiment 2 includes, in order from the object side, a first lens unit G1, a second lens unit G2, and a third lens unit G3. Also, in FIG. 3, reference symbol CG represents a cover glass.

The first lens unit G1 includes, in order from the object side, a positive meniscus lens L11 with a concave surface facing the object side, a positive meniscus lens L12' with a concave surface facing the object side, a biconvex lens L13' (Gm2), and a cemented doublet of a biconvex lens L14 and a biconcave lens L15, and has positive refracting power as a whole.

The biconvex lens L13' (Gm2) is constructed to be movable along the optical axis for correcting fluctuation of aberrations produced in accordance with variations of temperature of the microscope objective and ambient temperature around the microscope objective.

The second lens unit G2 is constructed with a biconvex lens L21'(Gm).

Also, the second lens unit G2 (Gm) is constructed to be movable along the optical axis so that fluctuation of aberrations produced in accordance with variation of the thickness of a nearly plane-parallel plate, such as a cover glass or a Petri dish, interposed between the observation object and the first lens unit G1 can be corrected.

The third lens unit G3 includes, in order from the object side, a cemented doublet of a biconcave lens L31' and a biconvex lens L32, a cemented doublet of a biconvex lens L33 and a biconcave lens L34, a cemented doublet of a negative meniscus lens L35 with a concave surface facing the object side and a positive meniscus lens L36 with a concave surface facing the object side, and a cemented doublet of a negative meniscus lens L37' with a concave surface facing the object side and a positive meniscus lens L38' with a concave surface facing the object side.

The biconcave lens L34 and the negative meniscus lens L35 are such that a set of concave surfaces adjacent and opposite to each other are configured as air contact surfaces.

In view of the second aspect of the present invention, the lenses constituting the microscope objective of Embodiment 2 are divided into three groups that are, in order from the object side, a front group GF, a middle group GM, and a rear group GR. The lenses L11 to L13 form the front group GF, which has a positive refractive power as a whole. The lenses L14 to L32 form the middle group GM, which has a positive refractive power as a whole. The lenses L33 to L38 form the rear group GR.

Subsequently, numerical data of optical members constituting the microscope objective of Embodiment 2 are shown below.

Numerical data 2 (Embodiment 2)

cover glass thickness: 0.1757 mm (at room temperature)
$\beta_0 = 10x$
$f = 17.95$ mm
$NA = 0.8$
$NA' = 0.08$
$f_R = -280$ mm
$D_0 = 85.0825$ mm
(where thickness of cover
glass is 0.1757 mm)
$H_1 = 11.28$ mm
$H_2 = 14.33$ mm
$R_1(r_1) = -6.2893$
$D_0/f = 4.74$
$H_2/H_1 = 1.27$
$f_R/f = -15.6$
$|R_1/f| = 0.35$
$\beta_2(\beta_m) = -1.07$

| | | | |
|---|---|---|---|
| $r_1 = -6.2893$ | $d_1 = 7.435$ | $n_{d1} = 1.788$ | $\nu_{d1} = 47.37$ |
| $r_2 = -8.4983$ | $d_2 = 0.435$ | | |
| $r_3 = -10.1532$ | $d_3 = 6.314$ | $n_{d3} = 1.603$ | $\nu_{d3} = 65.44$ |
| $r_4 = -11.3001$ | $d_4 = 0.1634$ | | |
| $r_5 = 123.3491$ | $d_5 = 5.3088$ | $n_{d5} = 1.497$ | $\nu_{d5} = 81.54$ |
| $r_6 = -22.1261$ | $d_6 = 0.6147$ | | |
| $r_7 = 22.8619$ | $d_7 = 8.5103$ | $n_{d7} = 1.497$ | $\nu_{d7} = 81.54$ |
| $r_8 = -23.4122$ | $d_8 = 2.5$ | $n_{d8} = 1.7725$ | $\nu_{d8} = 49.6$ |
| $r_9 = 58.226$ | $d_9 = 1.2807$ | | |
| $r_{10} = 177.3687$ | $d_{10} = 4.016$ | $n_{d10} = 1.497$ | $\nu_{d10} = 81.54$ |
| $r_{11} = -26.1937$ | $d_{11} = 0.4724$ | | |
| $r_{12} = -154.047$ | $d_{12} = 2.4$ | $n_{d12} = 1.7725$ | $\nu_{d12} = 49.6$ |
| $r_{13} = 15.83$ | $d_{13} = 7.7124$ | $n_{d13} = 1.43875$ | $\nu_{d13} = 94.93$ |
| $r_{14} = -22.5419$ | $d_{14} = 0.1279$ | | |
| $r_{15} = 16.67$ | $d_{15} = 6.3026$ | $n_{d15} = 1.43875$ | $\nu_{d15} = 94.93$ |
| $r_{16} = -35.2899$ | $d_{16} = 2.1$ | $n_{d16} = 1.6134$ | $\nu_{d16} = 44.27$ |
| $r_{17} = 15.1661$ | $d_{17} = 9.4155$ | | |
| $r_{18} = -10.7118$ | $d_{18} = 2.503$ | $n_{d18} = 1.788$ | $\nu_{d18} = 47.37$ |
| $r_{19} = -28.9605$ | $d_{19} = 6.5584$ | $n_{d19} = 1.43875$ | $\nu_{d19} = 94.93$ |
| $r_{20} = -14.3451$ | $d_{20} = 0.5248$ | | |
| $r_{21} = -57.7601$ | $d_{21} = 3.3962$ | $n_{d21} = 1.51633$ | $\nu_{d21} = 64.14$ |
| $r_{22} = -486.9661$ | $d_{22} = 5.4523$ | $n_{d22} = 1.673$ | $\nu_{d22} = 38.15$ |
| $r_{23} = -29.6884$ | | | | axial distance from surface $r_{23}$ to nosepiece mounting surface S: −10 mm

| ambient temperature | cover glass thickness | $d_0$ | $d_4$ | $d_6$ | $d_9$ | $d_{11}$ | $D_0$ | $D_0$ |
|---|---|---|---|---|---|---|---|---|
| room temperature | 0.1235 mm | 1.3975 | 0.1634 | 0.6147 | 1.408 | 0.345 | 75.0643 | 85.0643 |
| room temperature | 0.1757 mm | 1.3634 | 0.1634 | 0.6147 | 1.2807 | 0.4724 | 75.0825 | 85.0825 |
| room temperature | 0.254 mm | 1.3124 | 0.1634 | 0.6147 | 1.0746 | 0.6784 | 75.1097 | 85.0197 |
| 37° C. | 0.1197 mm | 1.3883 | 0.672 | 0.12 | 1.408 | 0.345 | 75.0652 | 85.0652 |
| 37° C. | 0.17 mm | 1.3552 | 0.672 | 0.12 | 1.2807 | 0.4724 | 75.0825 | 85.0825 |
| 37° C. | 0.2497 mm | 1.3029 | 0.672 | 0.12 | 1.0746 | 0.6784 | 75.1098 | 85.1098 |

Figure 5:
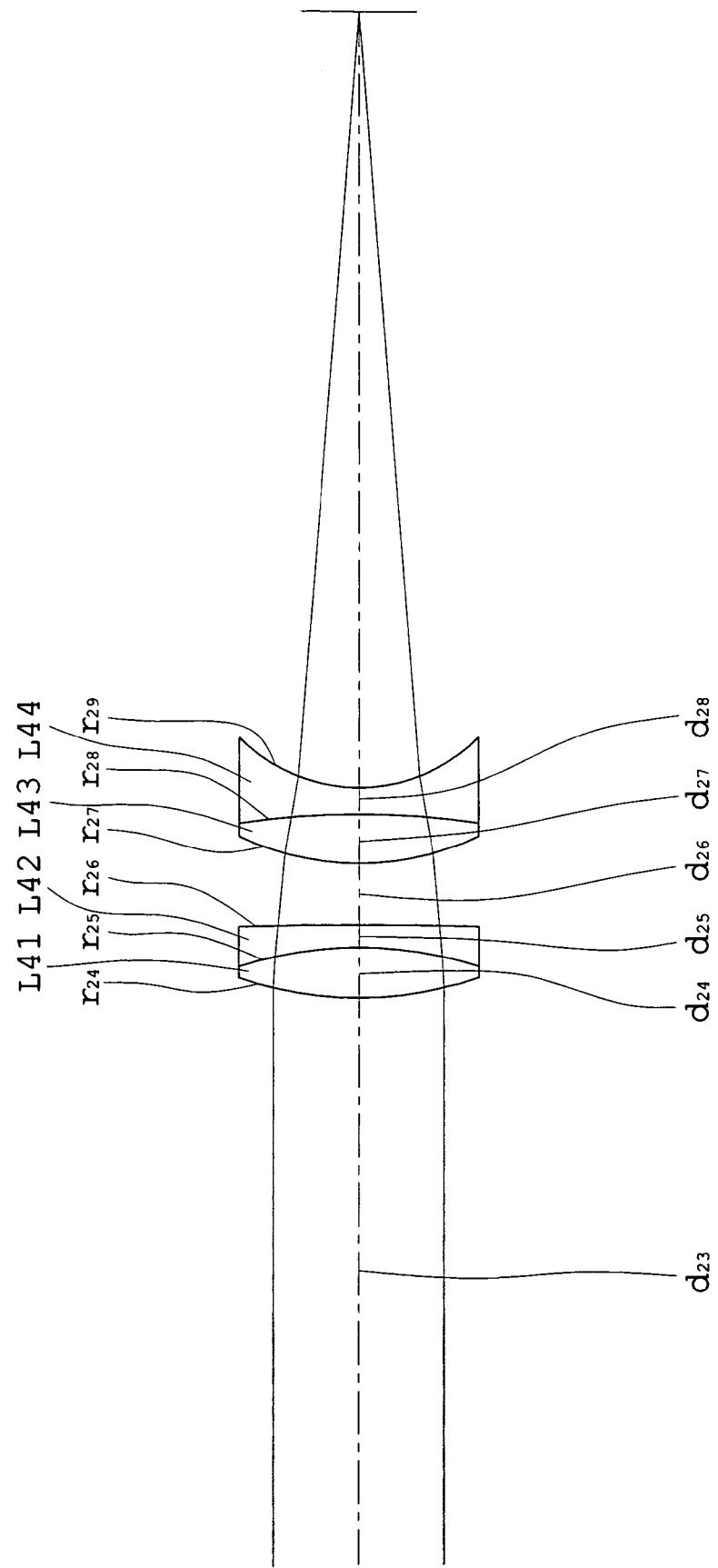
FIG. 5 is a sectional view showing a schematic arrangement, developed along the optical axis, of an imaging lens (a tube lens unit) combined with the microscope objective of each of the embodiments mentioned above.

FIG. 5 shows a schematic arrangement of an imaging lens (a tube lens unit) combined with the microscope objective of each of the embodiments mentioned above. This imaging lens is commonly used with the microscope objectives of the above embodiments.

The imaging lens combined with the microscope objective of each of the embodiments includes, in order from the object side, a cemented doublet of a biconvex lens L41 and a negative meniscus lens L42 with a concave surface facing the object side and a cemented doublet of a biconvex lens L43 and a biconcave lens L44.

Subsequently, numerical data of optical members constituting the imaging lens combined with the microscope objective of each of the embodiments are shown below. In the numerical data, ftl denotes a focal length of the entire imaging lens, and $d_{23}$ denotes an axial distance from the rearmost surface of the objective to the first surface of the imaging lens. Also, radii of curvature $r_n$, $r_{n+1}$, . . . of surfaces of the optical members; axial distances $d_n$, $d_{n+1}$, . . . between adjacent surfaces of the optical members (thicknesses or air spacings between them); refractive indices $n_{dn}$, $n_{dn+1}$, . . . of the optical members at the d line; and Abbe's numbers $\nu_{dn}$, $\nu_{dn+1}$, . . . of the optical members at the d line are indicated by numbers subsequent to surface numbers of the objective.

Numerical data 3 (imaging lens data used in each of Embodiments 1, 2)
ftl: 180 mm

| | | | |
|---|---|---|---|
| $r_{24} = 60.4357$ | $d_{24} = 8.5$ | $n_{d24} = 1.497$ | $v_{d24} = 81.54$ |
| $r_{25} = -67.2328$ | $d_{25} = 3.8$ | $n_{d25} = 1.72047$ | $v_{d25} = 34.71$ |
| $r_{26} = -640.476$ | $d_{26} = 10.2859$ | | |
| $r_{27} = 44.0586$ | $d_{27} = 8.5$ | $n_{d27} = 1.72342$ | $v_{d27} = 37.95$ |
| $r_{28} = -113.8863$ | $d_{28} = 4.4$ | $n_{d28} = 1.6134$ | $v_{d28} = 44.27$ |
| $r_{29} = 28.0371$ | | | |

Axial distance $d_{23}$ (mm) from the rearmost surface of the objective to the first surface of the imaging lens:

| | at room temperature | at 37° C. |
|---|---|---|
| Embodiment 1 | 80.8294 | 80.1551 |
| Embodiment 2 | 79.9517 | 79.9517 |

The microscope objective of the present invention is useful in the fields of medicine and biology in which it is desired that feeble light is observed by various observation techniques over a wide observation range.

What is claimed is:

1. A microscope objective comprising at least five lens components, which are divided into three groups that are, in order from an object side:
    a front group having a positive refracting power as a whole and having a meniscus lens component with an object-side surface thereof being concave toward the object side;
    a middle group having a positive refracting power as a whole and having a plurality of cemented lens components; and
    a rear group having a pair of concave air-contact surfaces arranged adjacent and opposite to one another,
    wherein the following conditions are satisfied:

$$3 \leq D_0/f \leq 6$$

$$1 \leq H_2/H_1 \leq 1.5$$

where $D_0$ is a distance, in millimeters, measured along on an optical axis, from an object surface to a rearmost surface of the microscope objective where a direction from the object side toward an image side is defined to be positive and the object surface is defined as a surface in which an observation object lies and which is perpendicular to the optical axis, f is a focal length of the microscope objective, $H_2$ is a height of a marginal ray as emergent from the rearmost surface of the microscope objective, and $H_1$ is a maximum height of the marginal ray as passing through the front group and the middle group.

2. A microscope objective according to claim 1, wherein the following condition is satisfied:

$$-20 \leq f_R/f \leq 6$$

where $f_R$ is a focal length, in millimeters, of the rear group as a whole.

3. A microscope objective according to claim 1, wherein the following condition is satisfied:

$$0.3 \leq |R_1/f| \leq 0.5$$

where $R_1$ is a radius of curvature of the object-side surface of the meniscus lens component in the front group.

4. A combination of a microscope objective according to claim 1 and an imaging lens, wherein the combination satisfies the following conditions:

$$7 \leq f$$

$$0.5 < NA$$

$$0.05 < NA'$$

where f is a focal length, in millimeters, of the microscope objective, NA is a numerical aperture on an entrance side of the microscope objective, and NA' is a numerical aperture on an exit side of the imaging lens.

5. A microscope objective according to claim 1, wherein the middle group has a positive lens component that is constructed to be movable along the optical axis for correcting fluctuation of aberrations produced in accordance with variation of a thickness of a cover glass.

6. A microscope objective according to claim 5, wherein the following condition is satisfied:

$$0.8 \leq |\beta_m| \leq 1.2$$

where $\beta_m$ is a lateral magnification of the positive lens component in the middle group calculated upon an image point formed by lenses arranged on the object side of the positive lens component being defined as an object point.

7. A microscope objective according to claim 1, wherein the front group has a positive lens component that is movable along an optical axis for correcting fluctuation of aberrations produced in accordance with variations of temperature of the microscope objective and ambient temperature around the microscope objective.

* * * * *